United States Patent [19]
Praetzel et al.

[11] 3,715,383
[45] Feb. 6, 1973

[54] PURIFICATION OF TETRABROMOPHTHALIC ANHYDRIDE

[76] Inventors: Hans Eberhard Praetzel, Schuberstrasse 3, Bensberg-Frankenforst; Ernst Neukirchen, Vorsterstrasse 75, Cologne-Kalk; Herbert Jenkner, Deutz-Kalker-Str. 66, Cologne-Deutz all of Germany

[22] Filed: Jan. 29, 1970

[21] Appl. No.: 6,934

[30] Foreign Application Priority Data

Jan. 30, 1969 Germany......................P 19 04 646.9
Jan. 31, 1969 Germany......................P 19 04 537.5

[52] U.S. Cl. .......260/475 PR, 260/75 M, 260/346.3, 260/475 B
[51] Int. Cl. .............................................C07c 69/82
[58] Field of Search ..........260/475 B, 475 PR, 346.3

[56] References Cited

UNITED STATES PATENTS 2,839,569  6/1958  Kramer.............................260/475 B
3,573,215  3/1971  Nametz et al. ....................260/346.3

FOREIGN PATENTS OR APPLICATIONS 690,931  7/1964  Canada ............................260/346.3

OTHER PUBLICATIONS

Calmon et al., Ion Exchangers in Organic and Biochemistry, pp. 640–643, (1957).
Nachod et al., Ion Exchange Technology, pp. 554–559, (1956).

*Primary Examiner*—Lorraine A. Weinberger
*Assistant Examiner*—E. Jane Skelly
*Attorney*—Burns, Doane, Benedict, Swecker and Mathis

[57]  ABSTRACT

A process for removing sulfate ions from crude tetrabromophthalic anhydride by dissolving it in an alcohol and then contacting the resultant solution with an anion exchanger.

10 Claims, No Drawings

PURIFICATION OF TETRABROMOPHTHALIC ANHYDRIDE

Tetrabromophthalic anhydride is produced by bromination of phthalic anhydride in oleum, e.g. production may be carried out in accordance with J. Am. Chem. Soc. 40 (1918), page 1, 416, Deutsche Auslegeschrift 1,093,052 and Deutsche Auslegeschrift 1,125,415. Other technical methods of producing tetrabromophthalic anhydride not using oleum are still unknown. However, the tetrabromophthalic anhydride so produced still contains slight amounts of sulfate ions. Such residues of sulfates cannot be removed by washing. They, nevertheless, greatly disturb the esterification of the tetrabromophthalic anhydride with alcohols. For instance the following cyclic acetals form with 1,2-glycols as the base materials in accordance with the following formula:

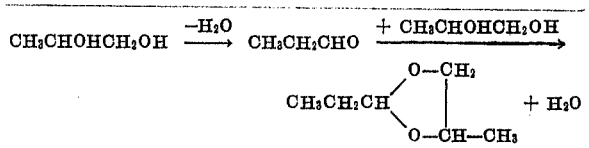

On account of the formation of the cyclic acetals, the esterification reaction comes to a standstill. J. Am. Chem. Soc. 40 (1918), page 1, 416, and Deutsche Auslegeschrift 1,271,396 propose for purification of tetrabromophthalic anhydride to dissolve same in aqueous alkali and to precipitate the tetrabromophthalic acid by means of a stronger acid. The acid must then be filtered and washed several times with hot water; subsequently dried for several hours at a temperature of 150°C to again form its anhydride. As would appear from Deutsche Auslegeschrift 1,271,396, this technically complex method, however, is successful only when tetrabromophthalic anhydride is subsequently recrystallized using dioxane as solvent. According to a second method, described in Deutsche Auslegeschrift 1,271,396, a base or a salt of a volatile acid is added to the tetrabromophthalic anhydride, whereupon this mixture is — if necessary, with other added polycarboxylic acids — condensed by means of polyhydric alcohols to form a polyester. It is true that the latter method is less complicated from a technical point of view, but it leads to polyesters with a higher color value than if a purified tetrabromophthalic anhydride is used.

For the production of proper high-quality polyester and moulded products, however, one must start with polyesters having a color value which is as low as possible. Therefore, possibilities have been searched to achieve this objective by a method which, technically, is as simple as possible.

A method has been found to make pure tetrabromophthalic esters by condensing tetrabromophthalic anhydride by means of alcohols, a method by which the sulphate residues contained in the tetrabromophthalic anhydride are removed. The method is characterized by the fact that the tetrabromophthalic anhydride contaminated with sulfate ions is dissolved in an alcohol, that this solution is treated, at temperatures ranging from 20° to 100°C, with an anion exchanger of an amount sufficient to combine with all the sulfate ions, that the solution is separated from the ion exchanger, and that subsequently the tetrabromophthalic ester is isolated from said solution.

For the method which is the subject of the present invention, one uses the tetrabromophthalic anhydride, as obtained by production from phthalic anhydride with bromine or with bromine and chlorine in oleum. This tetrabromophthalic anhydride contains 0.01 to 0.5 percent sulfate ions and, as stated before, in this form it is not suited for making esters.

To remove the sulfate ions, the tetrabromophthalic anhydride is, according to the present invention, dissolved in an alcohol. For this it is of advantage to maintain a temperature ranging between 20°C and the boiling point of the alcohol. In the broadest aspects any alcohol can be employed which will dissolve the tetrabromophthalic anhydride. The dissolving can be effected under widely varying conditions but is generally effected such that polyesterfication is inhibited. Means for inhibiting polyesterification are well known to those skilled in the art and include (1) the use of temperatures below which polyesterification occurs, (2) the use of alcohols having only one hydroxyl group which is esterifiable under the conditions employed, (3) the use of pressures at which polyesterification is inhibited and (4) the use of concentrations at which polyesterification does not take place. As will be apparent combinations of the above means can also be employed.

In one preferred embodiment of the present invention especially useful when it is desired to produce a purified monoester of tetrabromophthalic anhydride the alcohol employed is a monohydric alcohol and preferably one of the formula: $HO-C_nH_{2n+m}$, wherein $n$ is an integer from 1 to 12 inclusive and preferably 1 to 6 inclusive and $m$ is either plus 1 or minus 1. The preferred alcohols are those having a primary hydroxyl group. The tetrabromophthalic anhydride is mixed with these alcohols in a molar ratio of greater than 1:1 up to infinite dilution and preferably in molar ratios of 2:1 to 100:1. At lower ratios there is insufficient alcohol to dissolve and/or react with the tetrabromophthalic anhydride. At higher ratios separation of the tetrabromophthalic anhydride ester from its dilute solution becomes increasingly difficult and expensive without any commensurate benefit. Examples of suitable monohydric alcohols include among others methanol, ethanol, n-propanol, isopropanol, butanol, hexanol, 2-ethyl-hexanol, decanol, dodecanol, and cyclohexanol.

In another embodiment of the present invention the tetrabromophthalic anhydride is admixed with an alcohol having one and only one primary hydroxyl group and having at least one secondary hydroxyl group. These alcohols preferably have a normal boiling point of at least 120°C. While it is not desired to limit this preferred embodiment to any particular theory it appears that the primary hydroxyl group reacts with the tetrabromophthalic anhydride producing the monoester thereof. The monoester can then be freed of sulfate ions as described herein followed by polyesterification through the secondary hydroxyl group under conditions favoring polyesterification. Since the secondary hydroxyl group is potentially polyesterifiable the temperature of the solution is maintained at temperatures below which polyesterification occurs and generally below 100°C and preferably below 70°C. To further inhibit polyesterification these alcohols are mixed with tetrabromophthalic anhydride in molar ratios in excess of 2:1 and preferably from 2.5:1 to 100:1. Examples of such alcohols include among others 1,2-butanediol, 1,3-butanediol, 1,3-hexanediol, 1,2,3-hexanetriol and most preferably 1,2-propanediol.

Polyhydric alcohols having a plurality of primary hydroxyl groups are also within the broad scope of the present invention although they are outside the scope of the two above described groups of alcohols. However, polyesterificiation must be inhibited until after sulfate ion removal generally by employing a large excess of the alcohol such as molar ratios of alcohol to tetrabromophthalic anhydride of 2.5:1 to 100:1 and by maintaining the temperature of the solution below 100°C and preferably below 70°C. Examples of such polyhydric alcohols include among others ethylene glycol, diethylene glycol, glycerol, and trimethylol propane.

The tetrabromophthalic ester, or its alcoholic solution, is, in accordance with the present invention, treated with an anion exchanger preferably at temperatures of 20° to 100°C. As anion exchangers, one preferably uses such based on high polymer resins which, as active groups, contain such with nitrogen atoms reacting as bases. The exchangers AMBERLITE IR-45 of the firm Rohm and Haas Co. and LEWATIT MP 64 of the firm Farbenfabriken Bayer AG have proved to be particularly successful. Other suitable ion exchangers include Amberlite IR4B, Amberlite IRA-400 and Amberlite IRA-410 all available from the Rohm and Haas Co.; DeAcidite and Permutit S available from the Permutit Co.; Wofatit M available from I.G. Farben; Duolite A-2 and Duolite A-3 available from Chemical Process Co.; and Dowex 1 and Dowex 2 available from the Dow Chemical Co. Especially the anion exchangers should be effective at temperatures of 50°C to 100°C. Preferably the anion exchangers are added as powders or granules to the tetrabromophthalic esters or its alcoholic solution, maintained at the temperature indicated. One may also use anion exchangers diaphragms, for which the method of operation usual for diaphragm-shaped anion exchangers is employed. The anion exchanger is used at least in such amounts that it can combine with all the sulfate ions contained in the tetrabromophthalic anhydride. The amount is thus governed by the capacity of the ion exchangers, an excess quantity being of advantage.

The ester of the tetrabromophthalic acid or its alcoholic solution must be brought into intimate contact, so that the anion exchanger combines with the sulfate ions quantitatively, the mixture being maintained at a temperature of 20° to 100°C, preferably at 50° to 100°C. The times of treatment are governed by the activity and the excess quantity of the ion exchanger and are about 10 minutes to 10 hours.

Subsequently the monoester of the tetrabromophthalic acid or its alcoholic solution is separated from the anion exchanger in accordance with conventional methods, e.g. by filtration, decantation or centrifugation. Such separation is carried out preferably at the temperature for ion exchanging. The anion exchanger may, if necessary, after regeneration with usual regeneration agents, e.g. an aqueous sodium hydroxide solution, be used for another operation.

In the ester of the tetrabromophthalic acid or its alcoholic solution, sulfate ions can no longer be proved to be present. Unless the ester is dissolved in excessive amounts of alcohol, it can directly be used, as customary, for chemical, medical or pharmaceutical applications. However, if the ester is highly diluted in alcohol, the ester is obtained form the solution by distillation of the excess alcohol. By saponification in accordance with known methods, it is possible to obtain from the ester the tetrabromophthalic acid and, from same, by heating to a temperature of 150°C, the anhydride of said acid. If there is an ester of a secondary alcohol having a boiling point above 120°C, it may be esterified further. In this case the molar ratio of tetrabromophthalic acid to alcohol during polyesterification should amount to approximately 1:2.1 to 1:2.2. The mixture is agitated and esterified at temperatures of 120°C, up to the boiling point of the alcohol, the water formed being removed by distillation. It is advantageous to carry out this esterification in an atmosphere of inert gas, such as nitrogen or carbon dioxide. In this one obtains esters having low color values, which may be used inter alia as flame protection components especially for transparent varnishes.

The tetrabromophthalic ester free of sulfate ions or its alcoholic solution may be used for making polyesters in accordance with known processes, without any side reactions taking place. For this purpose, the monoester consisting of tetrabromophthalic acid and polyfunctional alcohol is heated with such amounts of this alcohol that the molar ratio between acid groups and hydroxyl groups amounts to approximately 1:1.05 to 1:1.1. In this, alcohol quantities which in the beginning, as the case may be, may have been used for dissolving the tetrabromophthalic monoester, must also be taken into account. This mixture is heated to temperatures between 120°C and the boiling point of the alcohol.

To the tetrabromophthalic monoester or its alcoholic solution, however, other polycarboxylic non-saturated and, if necessary, saturated acids or anhydrides may be added, such as maleic anhydride, fumaric acid, sebacic acid, adipic acid, suberic acid, phthalic anhydride. Furthermore, to this mixture polyfunctional alcohols, such as ethylene glycol, diethylene glycol, 1,2-propanediol 1,3-propanediol, glycerine, trimethylol propane, trimethylol ethane, pentaerythrite may be added above or in the form of a mixture. It is recommended in this respect to maintain an excess of hydroxyl groups in relation to the acid groups of 5 to 10 mole per cent. The mixture obtained is then esterified by agitation and simultaneous heating to 120°C up to the boiling point of the alcohol, the water formed being removed by distillation. It is advantageous to carry out this esterification in an atmosphere consisting of inert gas, such as nitrogen or carbon dioxide. Thus, polyesters of low color values are obtained.

The polyesters produced in accordance with the present invention and which still include olefinic double bonds due to the unsaturated acids or anhydrides employed, may be used in accordance with known methods to produce flame-resistant and self-extinguishing moulded products. For this the polyesters are dissolved in styrene containing a polymerization inhibitor. These solutions, too, have low color values and may be preserved for long periods without changing. By addition of a polymerization catalyst, such as an organic peroxide, moulded products, are produced from this material the properties of which may be varied in the same way as the properties of known polyesters that do not contain any tetrabromophthalic anhydride. Thus, polyesters for most different technical applications may be produced.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

500 g of crude tetrabromophthalic anhydride containing a contaminating amount of sulfate ion measured as greater than 20 ppm sulfur are dissolved in 500 g of methanol, while the temperature is increased to more than 50°C. To the solution cooled to 50°C. one adds 2 g of a basic ion exchanger, and the mixture is agitated for 4 hours. Then the loaded ion exchanger is removed by filtration, and the methanolic solution is evaporated, the tetrabromophthalic monomethylester being separated in solid form. The yield of 530 g is almost quantitative. The sulfur content of less than 20 ppm is thus below the limit above which it can be proved to be present.

EXAMPLE 2

In accordance with the method of operation in Example 1, 500 g of crude tetrabromophthalic anhydride containing a contaminating amount of sulfate ion measured as greater than 20 ppm sulfur are dissolved in ethanol, while the temperature is increased to approximately 70°C. To the solution cooled to approximately 50°C, one adds 2 g of a basic ion exchanger, and the mixture is agitated for 4 hours. The loaded ion exchanger is then removed by filtration, and the ethanol-containing solution is evaporated, the tetrabromophthalic monoethylester being separated in solid form. Here, too, the yield of 545 g is above 99 percent; the sulfur content is below the limit at which it can be proved to be present.

EXAMPLE 3

113 parts by weight of crude tetrabromophthalic anhydride containing a contaminating amount of sulfate ion measured as greater than 20 ppm sulfur are within 2 hours dissolved in 220 parts by weight of propanediol-1,2 at 120°C. The obtained clear reaction product is cooled to 50°C and 5 parts by weight of a newly loaded anion exchanger based on a high-polymer resin with basic amino groups as active groups are added. At this temperature, the mixture is agitated for 4 hours. The ion exchanger is subsequently removed by filtration, and the solution freed from sulfate ions is heated to 120°C. To this mixture 234.5 parts by weight of maleic anhydride are added, and subsequently the temperature is slowly raised to 180°C, the water formed by esterification being distilled off. The esterification period is 6 to 8 hours. During the reaction, a nitrogen atmosphere is maintained in the reaction mixture.

One obtains 505 parts by weight of polyester having an acid number of less than 35.

140 parts by weight of this polyester are dissolved in 60 parts by weight of newly distilled styrene, while 0.1 parts by weight of hydroquinone are added. The color value of this solution according to DIN 53 409 (APHA method) amounts to 125 to 150.

EXAMPLE 4

110 parts by weight of crude tetrabromophthalic anhydride containing a contaminating amount of sulfate ion measured as greater than 20 ppm sulfur are dissolved, by the method described in Example 3, in 220 parts by weight of 1,2-propanediol and treated with an anion exchanger. After filtration, the solution freed from sulfate ions is heated to 120°C, whereupon 198 parts by weight of 1,2-propanediol 343 parts by weight of maleic acid and 188 parts by weight of phthalic anhydride are added. The mixture is subsequently esterified, as described in Example 3. One obtains 940 parts by weight of a polyester having an acid number of less than 35.

65 parts by weight of this polyester are dissolved in 35 parts by weight of newly distilled styrene, while 0.05 parts by weight of hydroquinone are dissolved. The color value of the solution in accordance with DIN 53,409 (APHA method) amounts to 130.

EXAMPLE 5 (COMPARISON)

In a reaction vessel, 113 parts by weight of tetrabromophthalic anhydride containing 0.12 percent sulfate ions and 220 parts by weight of 1,2-propanediol are mixed at a temperature of 120°C. To this mixture 0.75 parts by weight of sodium acetate and 234.5 parts by weight of maleic anhydride are added, and the reaction mixture is heated to a temperature of 160°C. The temperature of the reaction mixture is maintained, while the mixture is agitated, water being distilled off on account of the esterification taking place. Within 6 to 7 hours, the temperature is increased to 180°C. During the esterification, a nitrogen atmosphere is maintained in the reaction mixture. One obtains a polyester the acid number of which is less than 35. The yield amounts to 500 to 510 parts by weight.

140 parts by weight of this polyester are dissolved in 60 parts by weight of newly distilled styrene, while 0.1 parts by weight of hydroquinone are dissolved. The color value of this solution is determined in accordance with DIN 53 409 (APHA method); it is in excess of 250.

Although the invention has been described in considerable detail with reference to certain preferred embodiments thereof, it will be understood that variations and modifications can be effected within the spirit and scope of the invention as described above and as defined in the appended claims.

What is claimed is:

1. A process for removing sulfate ions from crude tetrabromophthalic anhydride containing such ions said process comprising:
   I. forming the monoester of tetrabromophthalic acid by dissolving the crude tetrabromophthalic anhydride in a monohydric alcohol having from one to 12 carbon atoms or in a polyhydric alcohol having at least one secondary hydroxyl group and having one and only one primary hydroxyl group to form a solution and then II. contacting said solution with an anion exchanger in order to remove the sulfate ions.

2. The process of claim 1 wherein said monohydric alcohol is a primary alcohol of the formula:

$HOC_nH_{2n+1}$ wherein n is an integer from 1 to 12 inclusive.

3. The process of claim 1 wherein said crude tetrabromophthalic anhydride is dissolved in 1,2-propanediol to form said solution.

4. The process of claim 2 wherein said primary alcohol is methanol.

5. The process of claim 4 wherein said methanol and tetrabromophthalic anhydride are present in said solution in a molar ratio of from 2:1 to 100:1.

6. The process of claim 1 wherein the dissolving is conducted at a temperature between 20°C and the boiling point of the alcohol.

7. The process of claim 1 wherein the molar ratio of tetrabromophthalic anhydride to alcohol is equal to or greater than 1:1.

8. The process of claim 1 wherein the polyhydric alcohol has a normal boiling point of at least 120°C.

9. The process of claim 1 wherein the anion exchanger is a high polymer resin having as active groups nitrogen atoms which are reactive as bases.

10. The process of claim 1 wherein the anion exchanger will exchange its anions for sulfate ions within a temperature of 50° to 100°C.

* * * * *